United States Patent [19]
Iwama et al.

[11] Patent Number: 5,640,274
[45] Date of Patent: Jun. 17, 1997

[54] ELECTROCROMIC REARVIEW MIRROR FOR AN AUTOMOBILE IMPROVED IN A WATER PROOF ABILITY

[75] Inventors: Tokumitsu Iwama, Shimizu; Michiaki Hattori, Fujieda, both of Japan

[73] Assignee: Murakami Kaimeido Co., Ltd., Shizuoka, Japan

[21] Appl. No.: 579,228

[22] Filed: Dec. 28, 1995

[30] Foreign Application Priority Data

Dec. 29, 1994 [JP] Japan .................. 6-338485

[51] Int. Cl.⁶ ............... G02B 27/00; G02B 5/08; G02F 1/15; G02F 1/153
[52] U.S. Cl. ............ 359/601; 359/602; 359/603; 359/604; 359/265; 359/270; 359/272
[58] Field of Search ................... 359/601, 602, 603, 604, 610, 611, 265, 270, 272; 219/219

[56] References Cited

U.S. PATENT DOCUMENTS

| | | | |
|---|---|---|---|
| 4,442,019 | 4/1984 | Marks | 252/309 |
| 4,631,732 | 12/1986 | Christensen | 372/87 |
| 5,233,461 | 8/1993 | Dorman et al. | 359/272 |
| 5,358,588 | 10/1994 | Tahara et al. | 156/49 |
| 5,448,397 | 9/1995 | Tonar | 359/603 |

FOREIGN PATENT DOCUMENTS

| | | | |
|---|---|---|---|
| 66161 | 5/1979 | Japan | 359/265 |
| 45226 | 3/1985 | Japan | 359/265 |

*Primary Examiner*—Paul M. Dzierzynski
*Assistant Examiner*—Mohammad Y. Sikder
*Attorney, Agent, or Firm*—Michael J. Striker

[57] ABSTRACT

An EC mirror having an end surface of layers consisting of an ECD, an output electrode, and a clip electrode, prevents attacking by water submerging through the end surface, improves sealing ability with the mirror holder, prevents the mirror from chattering and a strange noise due to a vibration of the mirror, improves an anti-impact ability of the ECD end surface. An insulating member is disposed to cover ECD periphery portions and connecting portions of an output electrode, the clip electrode and a harness cord. A water proof member is disposed on an outer periphery of the insulating member.

2 Claims, 5 Drawing Sheets

ELECTROCROMIC REARVIEW MIRROR FOR AN AUTOMOBILE IMPROVED IN A WATER PROOF ABILITY

BACKGROUND OF THE INVENTION

1. Field of the Invention

The present invention relates to an electrocromic rearview mirror used for an outer mirror for an automobile and improved in a water proof ability.

2. Description of the Relevant Art

It is known that the electrocromic mirror (EC mirror) is used for an anti-glare rearview mirror for the automobile in which a transparent type electrocromic device is used for automatically varying from a high reflective condition (DAY condition) to a low reflective condition (NIGHT condition).

In the EC mirror, normally a front reflecting surface of the mirror is covered(laminated) by the electrocromic device (ECD) which has a characteristic to act a reversible reaction in accordance with an applied electric current polarity so as to become a coloring condition or a bleaching condition and the reflectivity is controlled by varying the coloring level of ECD, thereby the anti-glare effect is generated against the backward vehicle head light during a night time running.

In order to obtain the effect as described above, the EC mirror is controlled so that the backward injecting light level is detected to increase the coloring level against the bright backward light (to level down the reflectivity) and to decrease the coloring level against the dark backward light (to level up the reflectivity).

While, as shown by FIG. 6, for example, ECD used for the EC mirror is formed that ITO layer A, the first electrocromic layer B, a solid electrolyte layer C, the second electrocromic layer AD and ITO layer or A1 layer E are laminated on a transparent substrate such as a glass.

The ITO layer A and ITO layer or A1 layer E also function as a transparent electrode and an opposite electrode having a high reflectivity, respectively. Electric conductive clip electrodes are attached on respective output electrodes of upper and lower electrodes and an outer wiring (harness cord) is connected therethrough.

The bare clip electrode and ECD are physically and chemically weak, and the imperfect contact, the chattering of the mirror surface, the noise from the mirror or the like occurs. A vibration is applied on both clip electrode and harness or on both clip electrode and output electrode, there happens that the clip electrode drops out of the determined attaching position Further there are problems that the discharging is easily caused by water which drops from the harness and contacts the output electrode, a rust occurs on the clip electrode or the uneven coloring is caused by an atmosphere moisture.

Therefore it has been taught that the exposed whole surface of the clip is coated by an insulating coating material such as epoxy resin coating, urethane resin coating or acrylic coating as disclosed by a conventional example 1 of Japanese Utility Model Registration Publication No. Hei 5-22919.

In the EC mirror, it is taught that a rust proof and a water proof effect on the output electrode is achieved to support and cover the mirror end surface by a mirror holder made of a heat shrinkage resin as disclosed by a conventional example 2 of Japanese Utility Model Registration Publication No. Hei 6-16833.

In a conventional example 3 disclosed by Japanese Utility Model Registration Application Publication No. Hei 2-35120, a layer consisting of ECD is cased in a transparent resin made bag and the inside thereof is sealed in a deaeration manner.

In the conventional example 1 of the mirror disclosed by Hei 5-22919, only the clip is covered and protected by an insulating coating and the layer consisting of ECD needs to be sealed by a sealing resin, however, the sufficient water proof for ECD can not be achieved by the sealing resin only. In using the mirror, the coloring layer or the electrode layer of ECD is attacked by water moisture submerging from a short clearance between said resin and the substrate or from the sealing resin surface.

In the conventional example 2 disclosed by Hei 6-18833, there has been a problem of the heat generated from forming the holder attacking ECD and there is further problem in the sealing ability so that a tight sealing of the holder and the mirror body can not be achieved sufficiently. The water submerging is readily caused by a weak sealing ability and the chattering of the mirror surface occurs by a vibration due to a heavy weight of ECD.

In the conventional example 3 of the mirror disclosed by Hei 2-35120, the outer appearance of the mirror is decreased since the mirror is designed that a image is reflected crossing through a cover provided on the mirror and a wiring of the harness is not easily performed.

SUMMARY OF THE INVENTION

It is an object of the present invention to provide an electrochromic rearview mirror for an automobile improved in a water proof ability to overcome disadvantages described hereinbefore in which an end surface of a layer consisting of ECD, an output electrode and a clip electrode is prevented from exposing to an atmosphere and ECD is prevented from attacking by submerging water or the like from the end surface of the layer.

It is a further object of the present invention to improve a sealing ability of ECD and the mirror holder, to prevent a mirror holder from chattering or a noise generated by a vibration, to prevent the clip electrode from dropping out of the mirror by the vibration and to improve a impact durability on the end surface of ECD.

It is a further object of the present invention to protect ECD from a heating and to provide an electrocromic mirror which has a good appearance, which can be readily manufactured by a low cost and of which water proof ability is improved.

To achieve an object and other objects of the present invention, an electrocromic mirror of the present invention is characterized in that an insulating member (first shield) is disposed to cover the end surface of ECD and a water proof member (second shield) is disposed on the outer periphery the insulating member.

According to one of preferred embodiments of the present invention, an electrocromic rearview mirror is formed so that an electrocromic layer (EC layer) is disposed between an upper electrode and a lower electrode and sealed by two of upper and lower substrates and a sealing material (resin) in a fashion of exposing respective parts of said upper and lower electrodes, a clip electrode is connected to a harness cord and also connected to an output electrode of upper and lower electrodes, an insulating member covers over the clip electrode, a water proof member is disposed on an outside of the insulating member and a mirror holder is mounted on an outside of the water proof member.

The electrocromic rearview mirror according to the present invention, in which a connecting portion of the clip electrode and the harness cord is formed in parallel with the substrate, a part of harness cords, clip electrodes and upper and lower electrodes are respectively secured by the sealing resin and further covered by the insulating member and the water proof member is disposed over the outer periphery of the insulating member.

In the electrocromic rearview mirror according to the present invention, an epoxy resin, preferably an epoxy UV hardened type resin is used as the sealing material (resin). Further a coating which has a water proof ability and an electrical insulating ability, for example fluorocarbon coating is adequately used as the insulating member and other coating material which has a good sealing ability with the clip electrodes or the glass may be applicable. For a water proof member, a sheet type or a tape shaped high sticky butyl rubber which is extended between two released papers to the extent of 0.5 to 2 mm thickness is adequately used.

In accordance with the embodiment of the present invention, if the electrocromic mirror is wet by water, the mirror is protected by the water proof member which functions as a first shield and if a slight volume of water submerges through the water proof member, the insulating member acts as the second shield to protect the mirror from further water submerging so that it is possible to eliminate a decreasing of a coloring density due to a discharge of the wet clip electrode and further the mirror is protected from attacking by a rust or from water submerging through harnesses cords so that layers consisting of ECD can be prevented from attacking by a moisture. Moreover following effects are achieved by ECD of the present invention.

① The water proof member (butyl rubber) is provided between ECD and the mirror holder to improve the sealing ability of the mirror holder on ECD and the chattering due to a vibration on the mirror surface is prevented so as to improve a visibility on the mirror, to prevent the mirror from a strange noise and to prevent ECD consisting layers from peeling.

② The impact durability of the mirror used for the outer mirror of the automobile is improved by a sticky water proof material (butyl rubber).

③ The connecting portion of the harness cord and the clip electrode is secured so that an imperfect contact due to the vibration on the mirror surface is difficult to occur so as to prevent the clip electrode from dropping out or to prevent the mirror from splashing in case of being damaged.

④ The mirror is manufactured in a fashion that ECD periphery portion is not sealed by a heat shrinkage resin so as to prevent ECD from an adverse effect of the heat.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

The one of preferable embodiments of the present invention will be described in accordance with the accompanying drawings.

Figure 1:
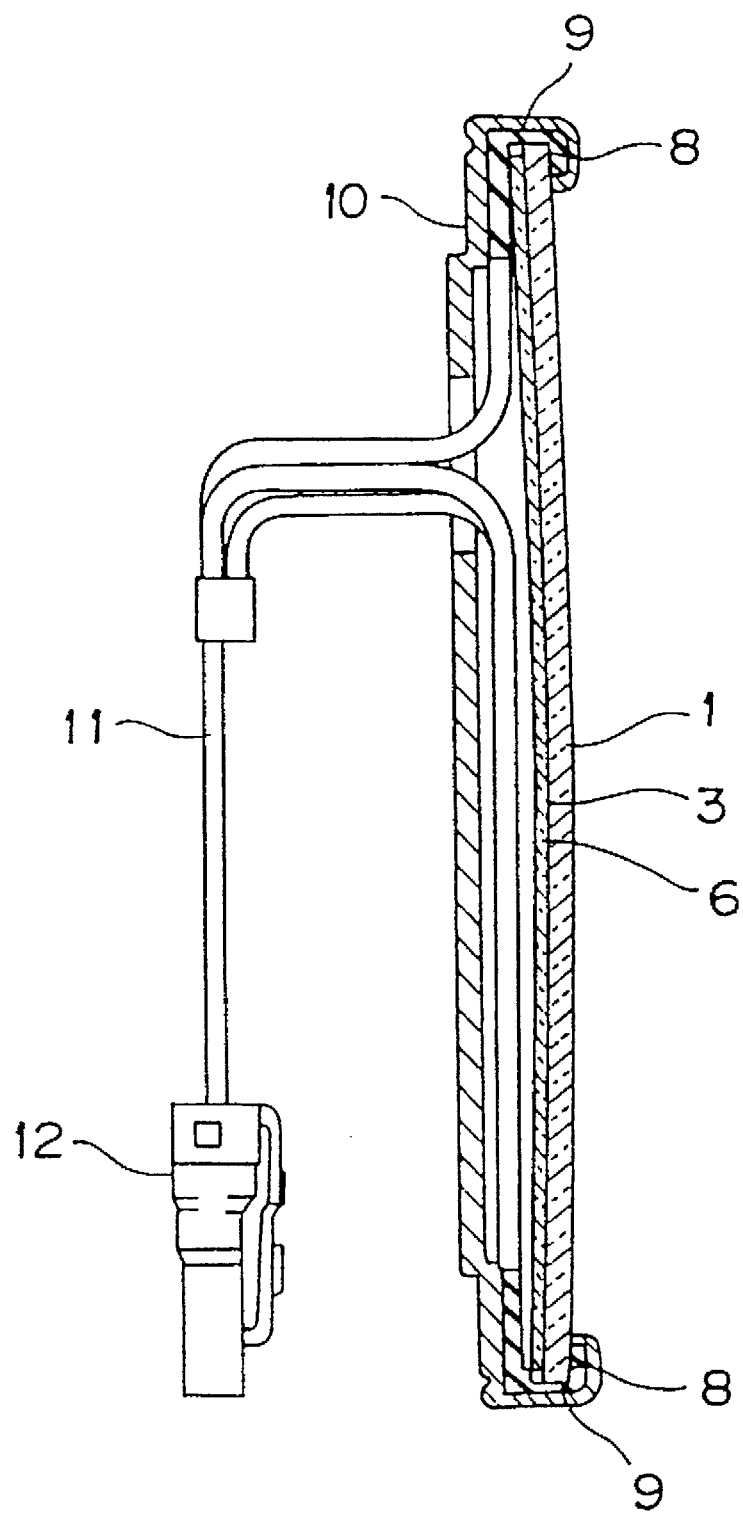
FIG. 1 is a schematic vertical section view of one of embodiments of the EC mirror according to the present invention.
Figure 2:
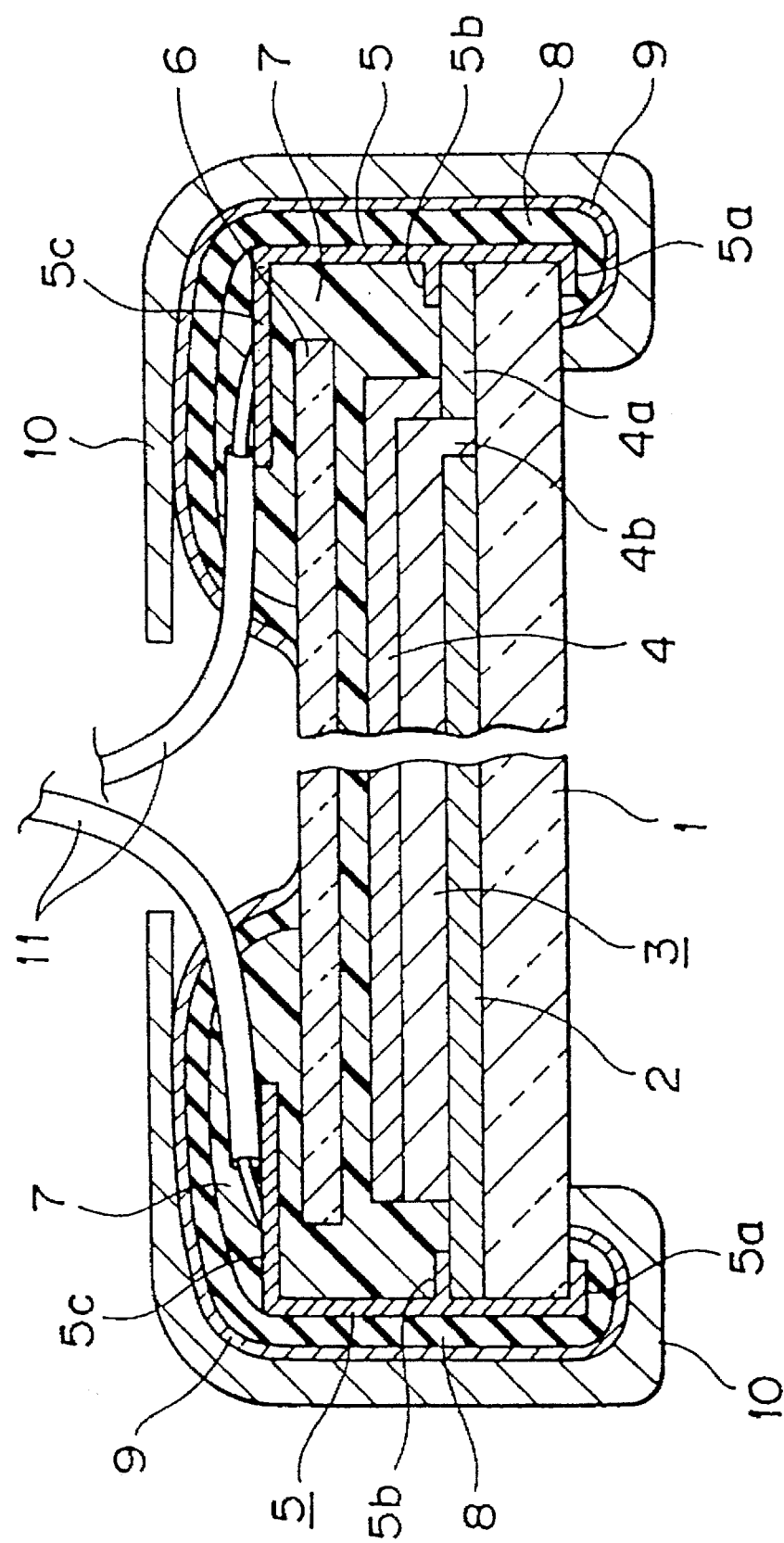
FIG. 2 is an enlarged vertical section view of EC mirror of FIG. 1.
Figure 3:
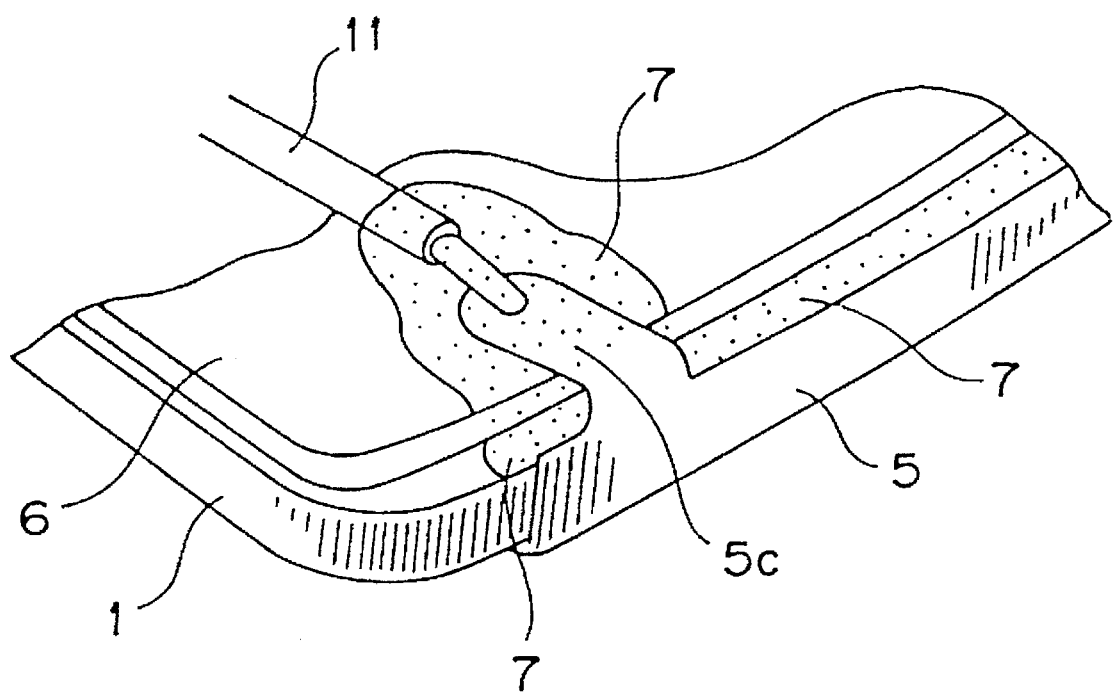
FIG. 3 is a partially perspective view of EC mirror of FIG. 1.

In FIG. 2, a numeral 1 indicates a transparent substrate formed of a glass plate or a plastic plate and a transparent electrode layer is formed on an upper surface of the substrate 1 by a vacuum depositing. At this stage, $SnO_3$, $In_2O_2$, ITO (a mixture of $SnO_2$ and $In_2O_3$) and ZnO are known as a transparent electrode material and ITO is used for an embodiment of EC mirror of the present invention.

A lower electrode 2 and an output electrode 4a for an opposite electrode (upper electrode) are separately formed on the transparent electrode layer by a photo-etching or a laser cutting.

Thereafter EC layer 3 is formed to form a first electrocromic layer composed of a mixture of iridium oxide and tin oxide, tantalum pentoxide which is an ion conductive layer and tungsten trioxide which is a second electrocromic layer, orderly.

Further A1 is evaporated as the upper electrode 4 having a highly reflectivity to contact with the output electrode 4a which is formed on the substrate 1 and the upper electrode 4 serves a reflecting surface.

For example two clip electrodes 5 having a spring ability and made of a metallic material such as phosphor bronze or the like are provided, respective harness cords(outer wirings) are connected to said clip electrodes by a soldering or an electrically conductive adhesive, pressing pieces 5a, 5b and a connecting piece 5c for the substrate are formed on the clip electrode 5 and the periphery of the substrate 1 is attached and held by pressing pieces 5a, 5b. The output electrode for upper and lower electrodes 2, 4 is pressed to attach on the substrate by pressing pieces 5a, 5b of clip electrodes.

A rear surface sealing substrate 6 made of the same material of the substrate 1 is laminated on the upper electrode 4 to case between clip electrodes 5, 5, thereafter the clearance formed between the clip electrode 5 and the lower electrode 2, between the clip electrode and EC layer 3 and between the upper electrode 4 and the sealing substrate 6 are filled with a sealing material 7 made of the epoxy UV hardened resin such as epoxy resin, an upper surface of the substrate 6 and a part of the clip electrode such as a connecting portion of the connecting piece 5c and the harness cord is also covered and sealed by said sealing material and the sealing material is hardened.

Due to the sealing material, the harness cord 11 is prevented from peeling out of the clip electrode, the clip electrode is prevented from dropping out of the substrate and an accurate positioning of the sealing substrate on EC layer 3 can be achieved.

Finally an insulating member 8 is disposed to cover over the clip electrode 5 exposing surface and an end surface(side surface) of ECD including the clip electrode. A fluorocarbon coating which has a water proof ability and an electric insulating ability is used as the insulating member and a water proof member 9 is disposed on a periphery of the insulating member. The sheet type or the tape shaped butyl rubber which has a high sticking ability is extended between two release papers to the extent of 0.5 to 2 mm thickness and is used for the water proof member. A mirror holder 10 is disposed to seal the inside thereof with said butyl tape.

The enlarged vertical section view of ECD as shown by FIG. 2 is partially deformed and does not indicate a correct dimensional ratio.

Figure 4:
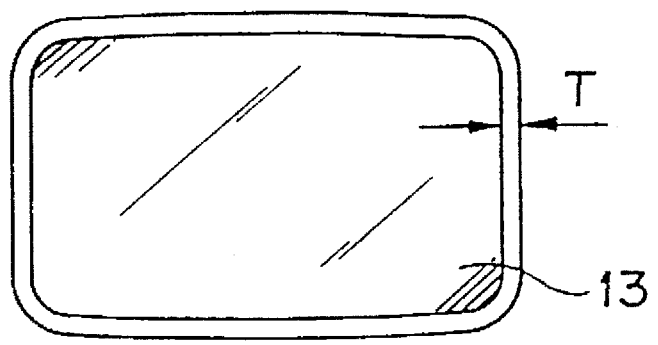
FIG. 4 is a schematic front view of EC mirror.
Figure 5:
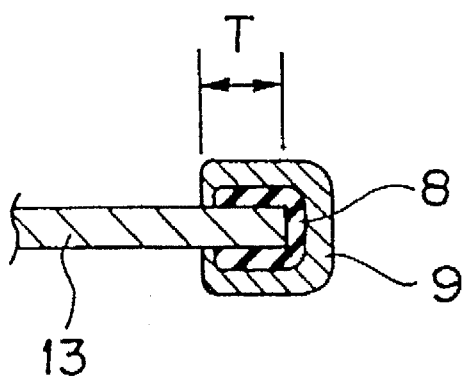
FIG. 5 is a partially enlarged view of EC mirror of FIG. 5.
Figure 6:
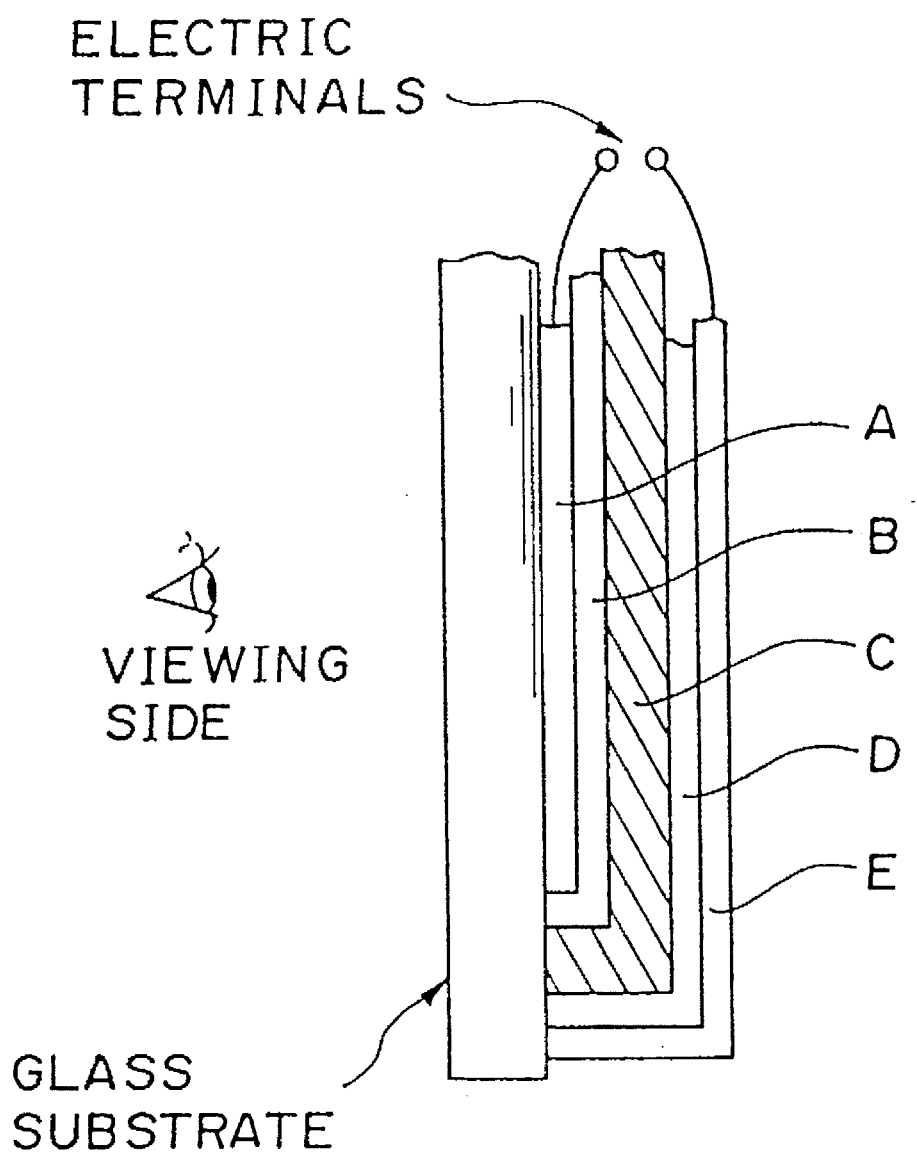
FIG. 6 is an explanatory view of EC mirror according to the conventional invention.

While as shown by FIG. 2 and FIG. 4, it is preferably to mount the insulating member 8 and the water proof member 9 in a fashion that they can cover the peripheral portion (side surface) of ECD 13 so as to eliminate the clip electrode 5 exposing part. The covered width T on the mirror outer surface is set to the extent of 3 mm to achieve a wide mirror available surface and the width thereof on the mirror rear surface (sealing substrate side) is preferably set to be covered wider than that.

An outer mirror of the present invention which is composed described above is wet by water, the water proof member 9 functions as the first shield to prevent the water submerging and further the insulating member 8 functions as the second shield to protect the mirror from further water submerging for a slight volume of water submerging through the water proof member 9 if any.

We claim:

1. An electrochromic rearview mirror, comprising an electrochromic device including a transparent substrate forming an outside surface and having opposite surfaces provided with a pair of electrode layers on said opposite surfaces, an electrochromic layer laminated on at least one of said electrode layers, one of said electrode layers being a transparent electrode and the other of said electrode layers serving as a reflecting layer; an electrically conductive clip attached to an output portion of said electrode layers; a harness cord connected through a connecting piece to said electrically conductive clip; and covering means consisting of an epoxy resin which adheres to an end of said harness cord and said connecting piece and extends to a rear surface of said electrocromic device, a fluorocarbon which covers said epoxy resin and said electrically conductive clip and surrounds said outside surface of said electrochromic device, and a butyl rubber which covers said fluorocarbon.

2. An electrochromic rearview mirror, consisting of an electrochromic device including a transparent substrate forming an outside surface and having opposite surfaces provided with a pair of electrode layers on said opposite surfaces, an electrochromic layer laminated on at least one of said electrode layers, one of said electrode layers being a transparent electrode and the other of said electrode layers serving as a reflecting layer; an electrically conductive clip attached to an output portion of said electrode layers; a harness cord connected through a connecting piece to said electrically conductive clip; and covering means consisting of an epoxy resin which adheres to an end of said harness port and said connecting piece and extends to a rear surface of said electrocromic device, a fluorocarbon which covers said epoxy resin and said electrically conductive clip and surrounds said outside surface of said electrochromic device, and a butyl rubber which covers said fluorocarbon.

* * * * *